(12) United States Patent
Ikehata et al.

(10) Patent No.: US 7,355,620 B2
(45) Date of Patent: Apr. 8, 2008

(54) DIGITAL STILL CAMERA AND USER INSTRUCTION INPUT METHOD

(75) Inventors: Tatsuhiko Ikehata, Ome (JP); Tatsuro Abe, Ome (JP); Yasuhito Ambiru, Ome (JP); Shiro Nagaoka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 849 days.

(21) Appl. No.: 10/658,408

(22) Filed: Sep. 10, 2003

(65) Prior Publication Data
US 2004/0046887 A1    Mar. 11, 2004

(30) Foreign Application Priority Data
Sep. 11, 2002    (JP) .............................. 2002-265682

(51) Int. Cl.
H04N 7/14 (2006.01)
H04N 5/222 (2006.01)

(52) U.S. Cl. .............................. 348/14.03; 348/333.02; 345/173

(58) Field of Classification Search ............. 348/14.03, 348/333.02
See application file for complete search history.

(56) References Cited

U.S. PATENT DOCUMENTS

| 4,719,524 A * | 1/1988 | Morishima et al. ....... 360/73.05 |
| 4,988,982 A * | 1/1991 | Rayner et al. ............... 345/173 |
| 6,275,260 B1 | 8/2001 | Anderson |
| 6,690,387 B2 * | 2/2004 | Zimmerman et al. ....... 345/684 |
| 7,034,881 B1 * | 4/2006 | Hyodo et al. .......... 348/333.12 |
| 2002/0176016 A1 * | 11/2002 | Misawa et al. ........ 348/333.01 |

FOREIGN PATENT DOCUMENTS

| JP | 6-067796 | 3/1994 |
| JP | 6-343146 | 12/1994 |
| JP | 10-320165 | 12/1998 |
| JP | 11-032304 | * 2/1999 |
| JP | 11-341414 | 12/1999 |
| JP | 11-341418 | 12/1999 |
| JP | 2000-122779 | 4/2000 |
| JP | 2000-231431 | 8/2000 |
| JP | 2000-341572 | 12/2000 |
| JP | 2001-313915 | 11/2001 |
| JP | 2002-083456 | * 3/2002 |

OTHER PUBLICATIONS

Notification of Reasons for Rejection issued by Japanese Patent Office in Japanese Application No. 2002-265682, and English translation thereof.

* cited by examiner

*Primary Examiner*—Lin Ye
*Assistant Examiner*—Hung H. Lam
(74) *Attorney, Agent, or Firm*—Finnegan, Henderson, Farabow, Garrett & Dunner, L.L.P.

(57) ABSTRACT

There is disclosed a digital still camera in which a direction and speed of a tracing operation by user's fingertips on a touch panel are judged and a dynamic image reproduction process is executed in accordance with the direction and speed. For example, fast forward/rewind reproduction of a dynamic image is executed in response to a long and fast tracing operation to the right from the left or to the left from the right.

9 Claims, 6 Drawing Sheets

DIGITAL STILL CAMERA AND USER INSTRUCTION INPUT METHOD

CROSS-REFERENCE TO RELATED APPLICATIONS

This application is based upon and claims the benefit of priority from the prior Japanese Patent Application No. 2002-65682, filed Sep. 11, 2002, the entire contents of which are incorporated herein by reference.

BACKGROUND OF THE INVENTION

1. Field of the Invention

The present invention relates to a digital still camera including a touch panel as an input means and capable of recording/reproducing still and dynamic images, and a tracing operation of the touch panel.

2. Description of the Related Art

In a conventional digital still camera, setting of a strobe, setting of zoom photography, and operations concerning reproduction such as forwarding and enlargement/reduction of an image are carried out by buttons disposed on rear and top surfaces of a camera main body. When demands for sophistication of functions and miniaturization of the camera rise, it is difficult to simultaneously realize these demands. To realize the sophistication of the functions, it is necessary to dispose many buttons or to deepen a nest of an operation menu. Furthermore, to realize the miniaturization, the number of buttons is reduced, and the nest of the operation menu needs to be further deepened.

However, the increase of the number of buttons is disadvantageous for the miniaturization. The deepening of the nest of the operation menu lowers operability. To solve the problem, instead of increasing the number of mechanical buttons, a digital still camera including a touch panel which is input means has been developed. The touch panel includes a touch detection function, and is disposed in an LCD display section front surface in the camera rear surface. The menu or icon is displayed in the LCD display section, and the function corresponding to the touched menu can be executed.

However, the above-described touch panel simply has the functions of the buttons, and a depth of the nest of the menu at the time of the use of a multifunction is not very different from that in a button operation, and enhancement of the operability can hardly be anticipated.

In recent years, a digital still camera capable of recording/reproducing the dynamic image has started to spread. Since the icon displayed on the touch panel plays the same role as that of the button even in the digital still camera using the touch panel, the number of icons is limited. To mount various functions such as slow or frame feed reproduction of dynamic image data on the camera, many icons or buttons are required.

The dynamic image of the digital still camera will be brought into a situation where long-time recording is possible as in MPEG4 in near future. In this case, the demand for the multifunction concerning the dynamic image reproduction is assumed to further rise.

BRIEF SUMMARY OF THE INVENTION

An embodiment of the present invention may provide a digital still camera using a touch panel, in which not only an operation of pressing an icon displayed on the touch panel but also an operation in a "tracing" mode are possible and in which more functions and ease of using the camera by intuitive operability are realized.

According to one aspect of the present invention, there is provided a digital still camera comprising: a photographing section which converts an optical image into an electric signal; a recording section which records a dynamic image obtained by the photographing section as a dynamic image file in a storage medium; a reproduction section which reproduces the dynamic image recorded by the recording section; a display section which displays the dynamic image reproduced by the reproduction section; a touch panel which is disposed to cover a display surface of the display section and by which a user's instruction is inputted; a detection section which detects a tracing operation by a user on the touch panel; and a control section which judges a direction and speed of the tracing operation detected by the detection section and which determines a reproduction process in accordance with the direction and speed to control the dynamic image reproduction by the reproduction section.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described hereinafter in detail with reference to the drawings.

Figure 1:
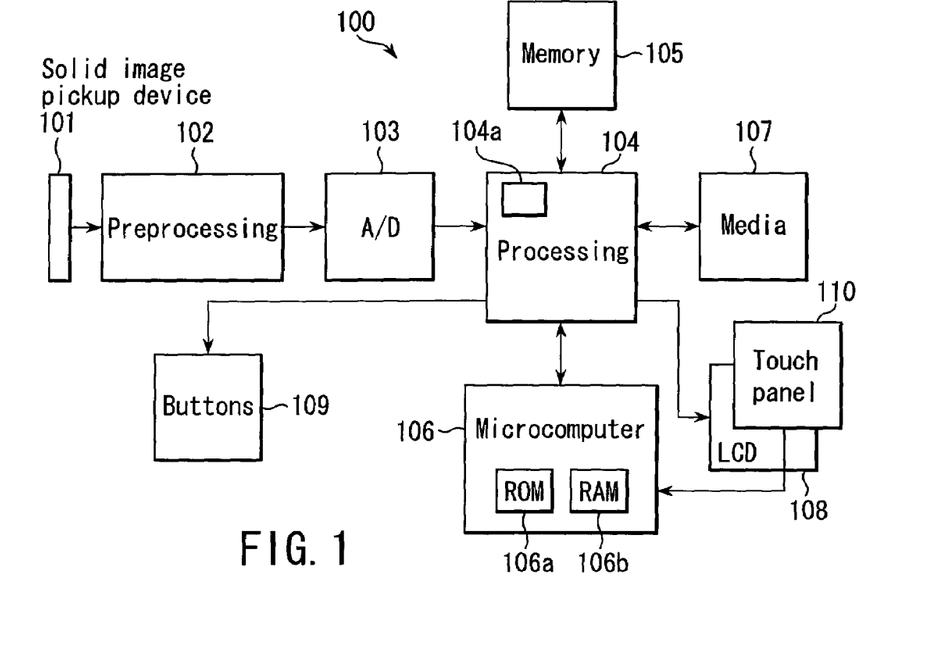
FIG. 1 is a block diagram showing one example of the constitution of a digital still camera 100 to which the present invention is applied.

FIG. 1 is a block diagram showing a constitution example of a digital still camera 100 to which the present invention is applied. A video signal from a solid image pickup device 101 is amplified and filtered by a preprocessing section 102, and thereafter converted to a digital signal by an A/D converter 103. The A/D converted signal is processed by a processing section 104, and recorded as image data in a memory 105. When the photographed image is a dynamic image, the image data is recorded in the memory 105, thereafter compressed by a compression system such as JPEG, and recorded as a dynamic image file in media 107.

The media 107 are recording media which are attachable/detachable such as a memory card. For example, the media 107 of 16 MB can be used to record/reproduce the dynamic image for about ten minutes.

The processing section 104 includes a dynamic image reproduction section 104a which has a plurality of functions for reproducing the dynamic image. In addition to standard reproduction of the dynamic image, the dynamic image reproduction section 104a has reproduction functions such as fast forward/rewind reproduction, slow reproduction/slow reverse reproduction, double-speed reproduction/double-speed reverse reproduction, and frame feed reproduction/reverse frame feed reproduction.

A microcomputer 106 includes a ROM 106a in which control programs including a program according to the present invention are stored, and a RAM 106b which is used as an operation area. The microcomputer 106 controls the respective apparatus sections in response to the user's instruction inputted via buttons 109 or touch panel 110. The microcomputer 106 writes the image data stored in the memory 105 into the media 107, outputs the data to an LCD 108 to display the image, or decodes the image data written in the media 107 to display the data in the LCD 108. The microcomputer 106 also controls the dynamic image reproduction section 104a to reproduce the dynamic image file stored in the media 107 in various modes such as standard dynamic image reproduction, fast forward reproduction, and slow reproduction.

Figure 2A:
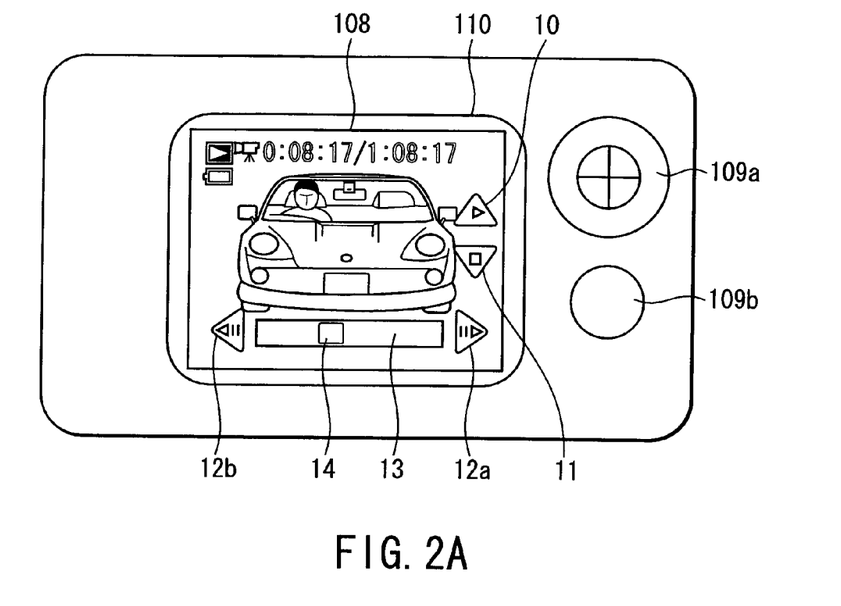
FIGS. 2A and 2B show one example of a rear view of the digital still camera in which a touch panel is used.
Figure 2B:
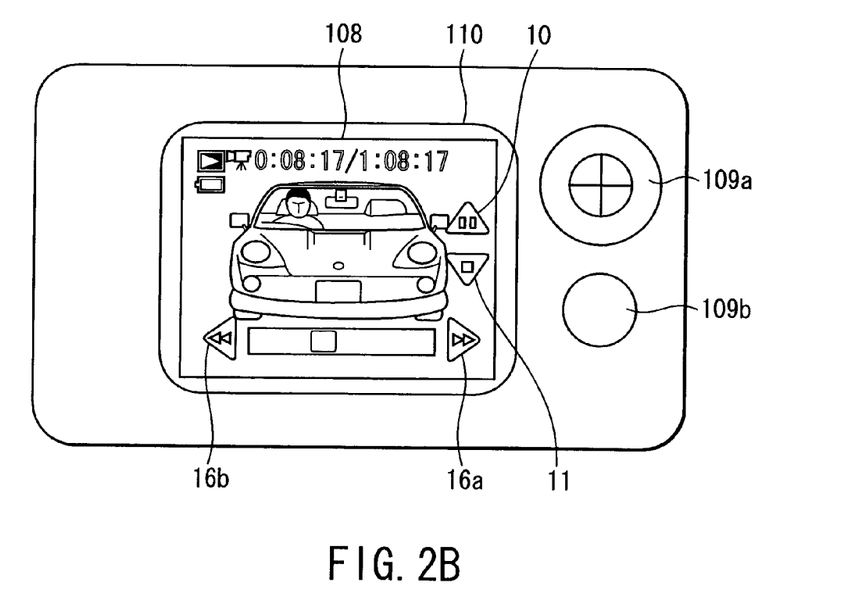

FIG. 2 shows plan views each showing one example of a rear surface constitution of the digital still camera 100 shown in FIG. 1. The color LCD 108, touch panel 110, cross key 109a, and mode key 109b are disposed. The touch panel 110 is disposed to cover the entire surface of the LCD 108. When person's fingertips or operation apparatuses such as a tracing pen contact (touch) the touch panel 110, the touch panel 110 can detect a coordinate of a contact portion.

Shown icons are displayed in the touch panel 110. Various functions in the dynamic image reproduction are allotted to the respective icons, and one function is executed in response to the touched icon. When nothing touches the touch panel 110 continuously for a predetermined time, the icon is not displayed. Moreover, when the fingertips touch an arbitrary position on the touch panel 110, the shown icon is displayed again.

In FIG. 2A, reference numeral 10 denotes a reproduction icon, 11 denotes an end icon, 12a denotes a frame feed icon, 12b denotes a reverse frame feed icon, 13 denotes a slide bar, and 14 denotes a cursor. In FIG. 2B, reference numeral 15 denotes a temporary stop icon, 16a denotes a fast forward icon, and 16b denotes a rewind icon.

The slide bar 13 shows one dynamic image file, and the cursor 14 denotes the present reproduction position. For example, while the dynamic image temporarily stops (see FIG. 2A), the fingertips touch the arbitrary position on the slide bar 13. Then, an image frame (still image) in the dynamic image file corresponding to the contact position is displayed. When the fingertip is brought in contact with the cursor 14 during the temporary stop, and the cursor is traced with the fingertip in a slide bar direction, the frame feed reproduction of the dynamic image is executed. When the fingertip is detached, the screen returns to a temporary stop screen.

At the time of standard reproduction of the dynamic image (see FIG. 2B), when the fingertips contact the arbitrary position on the slide bar 13, the reproduction is restarted from the image frame corresponding to the contact position. The "standard reproduction" indicates that the dynamic image is reproduced at a natural speed. Moreover, when the fingertip is brought into contact with the cursor 14, and the cursor is traced with the fingertip in the slide bar direction at the standard reproduction time, the fast forward/fast return reproduction of the dynamic image is executed. When the fingertip is detached, the screen returns to the standard reproduction screen.

Figure 3:
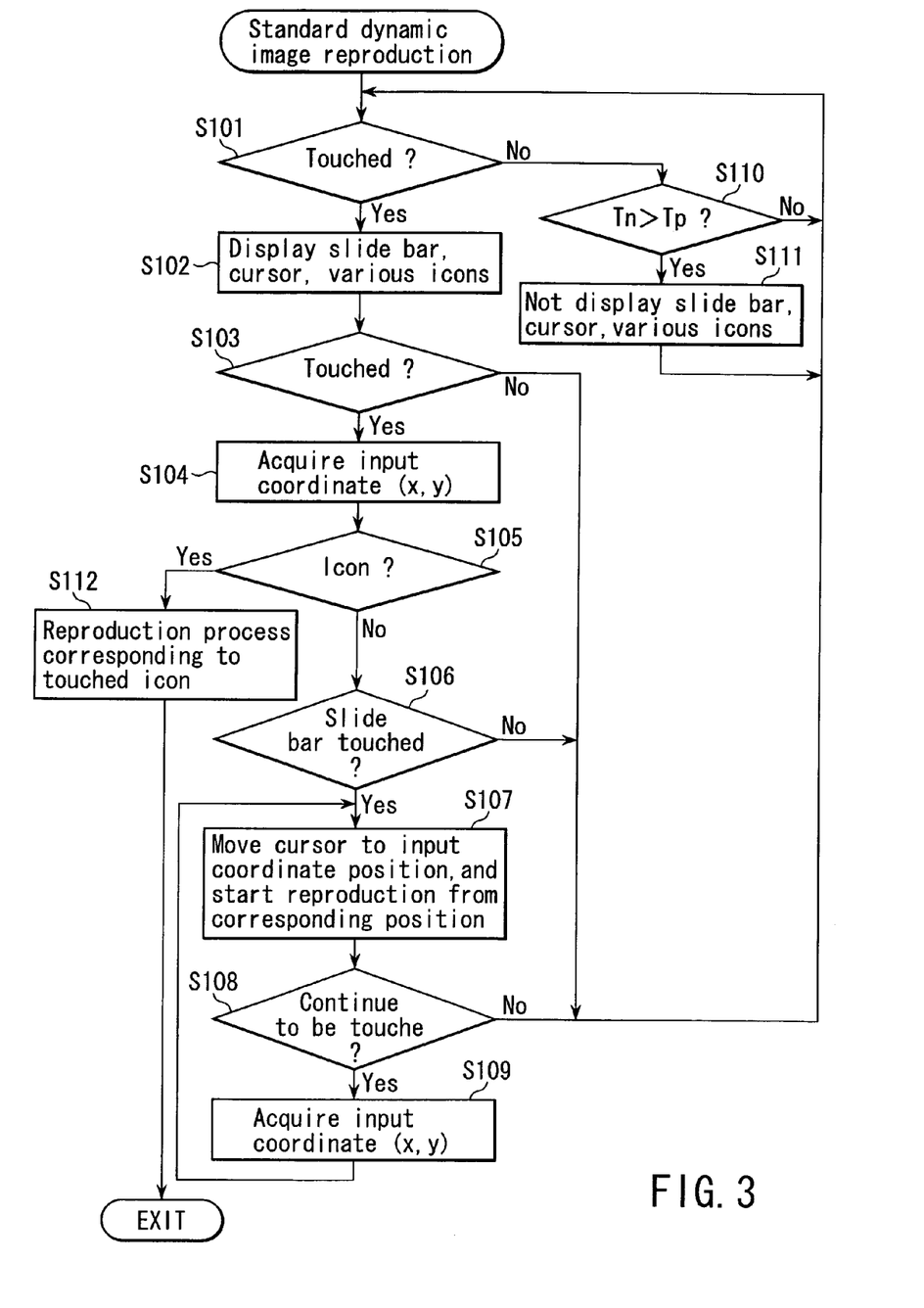
FIG. 3 is a flowchart showing one embodiment of a touch input process of detecting touch input on the touch panel and executing the corresponding process.
Figure 4:
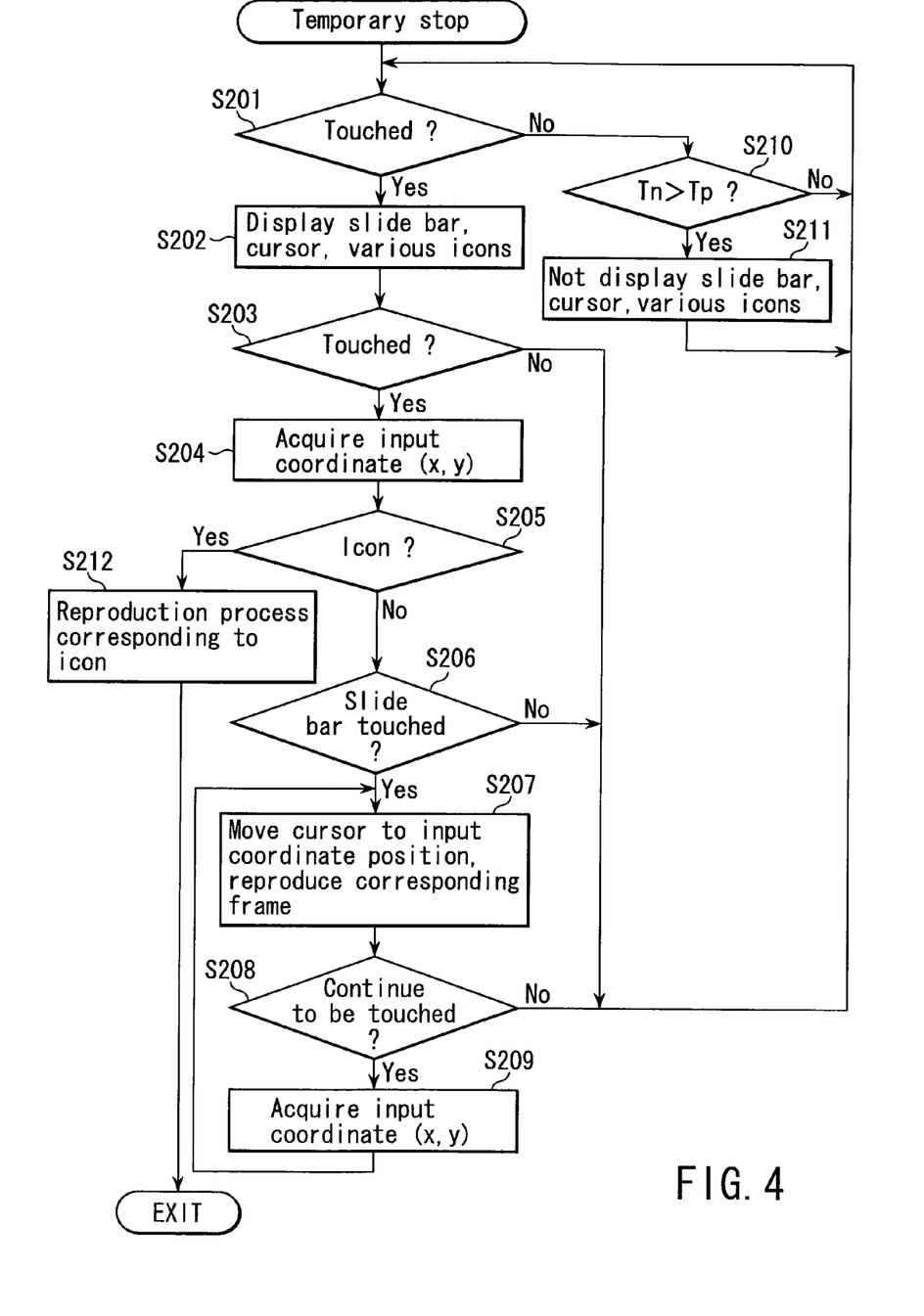
FIG. 4 is a flowchart showing the embodiment of the touch input process of detecting the touch input on the touch panel and executing the corresponding process.

FIGS. 3 and 4 are flowcharts showing one embodiment of a touch input process of detecting touch input on the touch panel and executing the corresponding process. The digital still camera 100 has modes such as a still image recording mode, still image reproduction mode, dynamic image recording mode, and dynamic image reproduction mode. The present invention relates to the dynamic image reproduction mode.

The dynamic image reproduction mode is a mode in which the finally recorded or reproduced image is a dynamic image, and is automatically set, when a lens cover (not shown) of the digital still camera 100 is closed and the power of the apparatus is turned on. It is to be noted that this dynamic image reproduction mode can also be set by the operation of the mode key 109b.

FIG. 3 shows the touch input process at the standard dynamic image reproduction time.

When the dynamic image is displayed in the LCD 108, if the touch input is started (S101), the microcomputer 106 displays the slide bar 13, cursor 14, and various icons (S102). The microcomputer 106 judges whether or not the panel is touched again after a predetermined short time (S103). When the panel is touched, coordinate (x, y) of the contact portion is acquired (S104).

Next, in step 105, the microcomputer 106 judges based on the coordinate of the contact portion acquired in the step 104 whether or not the icon is touched (S105). When the icon is not touched, the microcomputer 106 judges whether or not the slide bar 13 is touched (S106). When the slide bar 13 is touched, the cursor 14 is moved to the coordinate position acquired in the step 104, and the dynamic image reproduction is started from the image frame in the dynamic image file corresponding to the coordinate position.

Further in step 108, the microcomputer 106 judges whether or not the touch input continues. When the input continues, and after the input coordinate is acquired (S109), the process returns to the step 107 to move the cursor to the contact position. The dynamic image reproduction is started from the corresponding position in the dynamic image file. When the slide bar is traced with the fingertips (when the cursor 14 is operated) at the time of the standard dynamic image reproduction, the dynamic image is reproduced in such a manner that the image is fast forwarded or returned in response to the direction of the tracing operation.

When the touch panel is not touched in the step 101 (if NO), the microcomputer 106 judges whether or not an untouched period Tn exceeds a predetermined time Tp (S110). When the period exceeds the time, the slide bar 13, cursor 14, and various icons are not displayed (S111). The time Tn for which there is not any touch input exceeds the predetermined time Tp, and then the icons are not displayed.

When the icon is touched in the step 105, the microcomputer 106 controls the reproduction section 104a to execute the reproduction process corresponding to the touched icon. For example, when the temporary stop icon 15 is touched, the dynamic image displayed in the LCD 108 temporarily stops, and the still image is displayed.

FIG. 4 shows the touch input process in a temporary stop state.

This process is basically the same as that of FIG. 3, but is different in a process at a time when the slide bar is touched. That is, when the slide bar is touched in step 206, the microcomputer 106 moves the cursor 14 to the touched coordinate position, and reproduces an image frame (still image) in the dynamic image file corresponding to the coordinate position. Furthermore, in step 208 the microcomputer 106 judges whether or not the touch input continues. When the input is continued, the input coordinate is acquired (S209), the process returns to step 207, and the cursor is moved to the contact position to reproduce the image frame in the corresponding position in the dynamic image file. When the slide bar is traced with the fingertips in the temporary stop state in this manner, the dynamic image is reproduced in such a manner that the image is frame-fed.

Next, a second embodiment of the present invention will be described. In the present embodiment, various icons, slide bar 13, cursor 14, and the like shown in FIG. 2 are not displayed, and various reproduction functions such as the slow reproduction and frame feed reproduction are executed only by the tracing operation.

Figure 5:
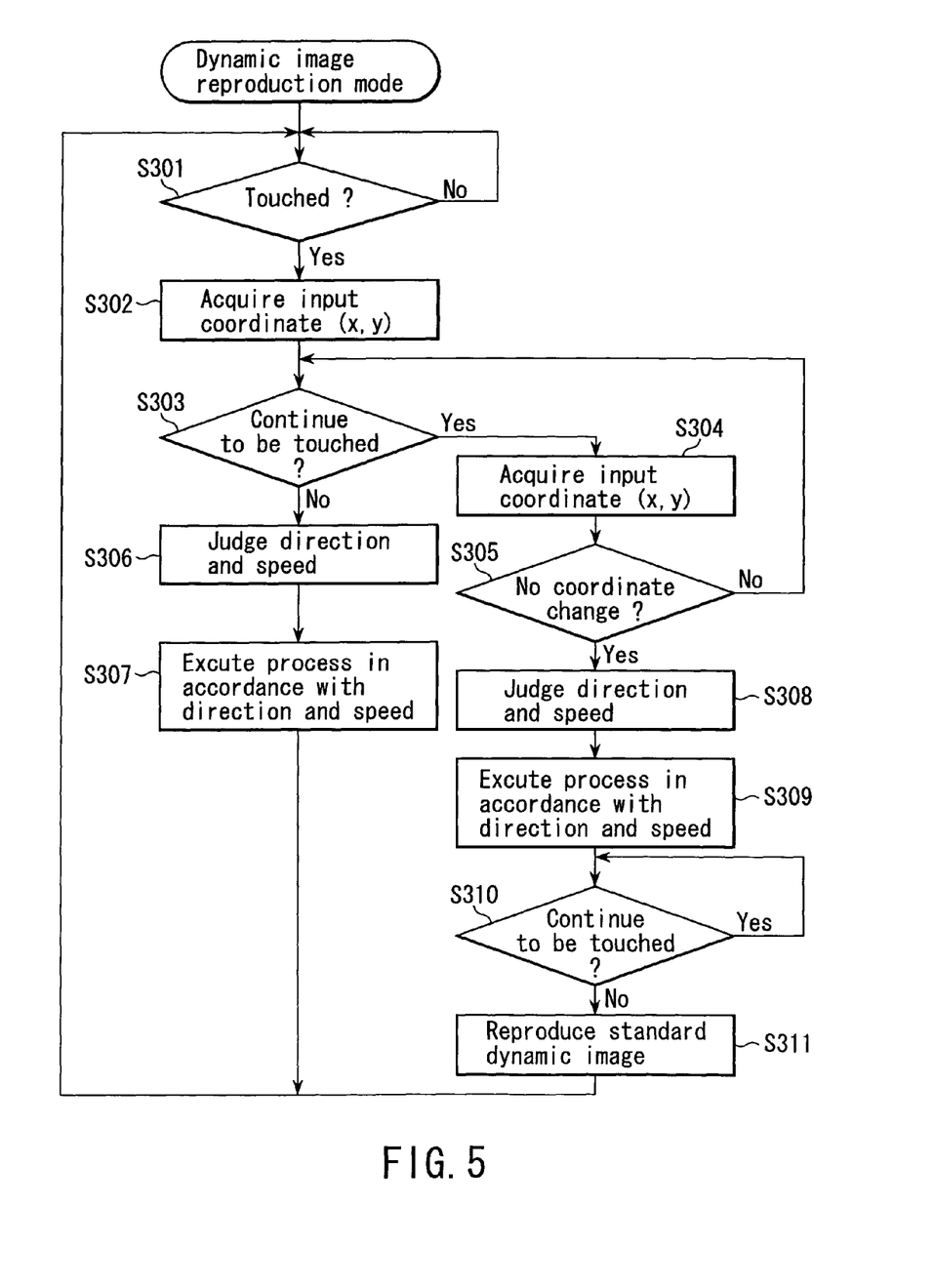
FIG. 5 is a flowchart showing an operation according to a second embodiment.

FIG. 5 is a flowchart showing the operation according to the present embodiment.

When the touch input is started (S301), the microcomputer 106 acquires the coordinate (x, y) of the contact portion (S302). After the predetermined short time, the microcomputer 106 judges whether or not the touch input continues (S303). When the input continues, the microcomputer again acquires the input coordinate (S304). The microcomputer 106 judges whether or not there is a change in the coordinate acquired in the steps 302 and 304 (S305). When there is the change (NO in the step 305), the microcomputer again judges whether or not the touch input continues (S303). When the input continues, the microcomputer acquires the input coordinate again (S304). The coordinate of the touched position is successively recorded in the RAM 106b every predetermined time, as long as there is the change in the acquired coordinate in this manner.

When the fingers are detached from the touch panel, and the touch input ends (NO in the step 303), the microcomputer 106 calculates a movement direction and speed of the contact position based on a plurality of coordinates acquired as described above (S306), and executes the reproduction process in accordance with the calculated movement direction and speed by the reproduction section 104a (S307). This reproduction process indicates the fast forward reproduction, slow reproduction, or standard reproduction of the dynamic image stored in the media 107.

When there is not any change in the acquired coordinate value in the step 305, that is, when one point on the touch panel continues to be touched, the microcomputer 106 calculates the movement direction and speed of the contact position based on a plurality of acquired coordinates (S308), and executes the process corresponding to the calculated movement direction and speed (S309). Furthermore, the microcomputer 106 judges whether or not the touch panel continues to be touched (S310). The reproduction process executed in the step 309 is maintained, as long as the arbitrary position of the touch panel continues to be touched. That is, after the reproduction section 104a starts the reproduction process in accordance with the direction and speed, and while the touch operation in the arbitrary position on the touch panel is detected, the microcomputer 106 controls the reproduction section 104a so as to continuously execute the reproduction process in accordance with the direction and speed. When the touch input ends (NO in the step 310), the reproduction process executed in the step 309 is canceled, and the standard dynamic image reproduction is carried out.

FIGS. 6 to 9 are diagrams showing the tracing operation according to the present embodiment. These tracing operations show the judgment result of the step 306, 308, or 310 of FIG. 5. In FIGS. 6 to 9, a bold solid line indicates a relatively fast tracing operation, and a bold dotted line indicates a relatively slow tracing operation. Here, for example, the word "fast" indicates a speed for crossing the LCD 108 to a left end from a right end in one second or less, and "slow" indicates a speed for crossing the LCD in a time longer than one second. The tracing operation shown by an arrow indicates the tracing operation in which the touch input ends (the finger is detached) in a terminal end (tip end) of the arrow. The tracing operation shown by a black circle indicates the touch input which continues in the position of the black circle (the position continues to be touched).

Figure 6A:
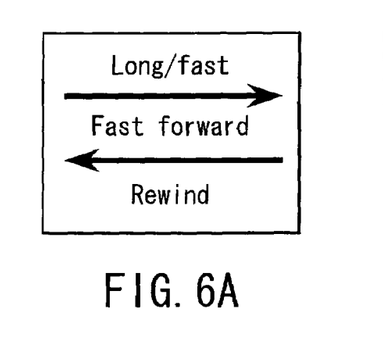
FIGS. 6A to 6C are diagrams showing a tracing operation according to the second embodiment.
Figure 6B:
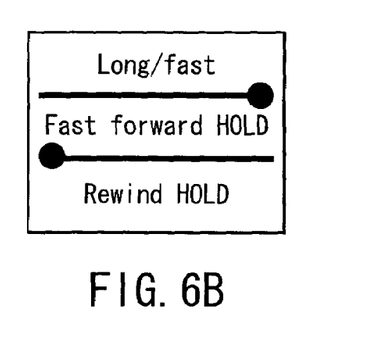
Figure 6C:
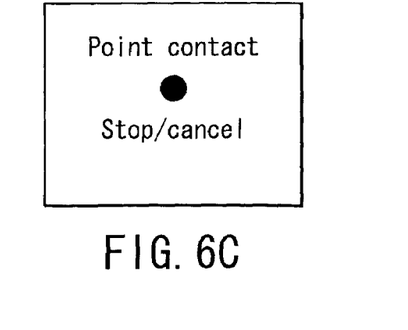

FIG. 6 shows the tracing operation showing the fast forward and rewind. When the touch panel 110 is long and fast traced to the right from the left or to the left from the right (horizontally) by the finger or operation apparatus (tracing pen) as shown in FIG. 6A, the fast forward/rewind of the dynamic image is executed. Here, "long tracing" indicates that, for example, a distance of ½ or more of the total width of the LCD 108 is traced. This fast forward/rewind reproduction is canceled by a tap operation of touching one arbitrary point on the touch panel 110 as shown in FIG. 6C, and the standard dynamic image reproduction is carried out. It is to be noted that when the tap operation is performed during the standard dynamic image reproduction, the image is stopped and the still image is displayed. When the tap operation is performed again during the stop of the image, the stop state is canceled and the standard dynamic image reproduction is carried out.

Moreover, as shown in FIG. 6B, the touch panel 110 is long and fast traced to the right from the left or to the left from the right (horizontally) by the finger or operation apparatus (tracing pen). Thereafter, without detaching the fingers from the touch panel, the pressed state is maintained. Accordingly, the fast forward and rewind of the dynamic image are maintained. When the fingers are detached, the operation is canceled, and the standard dynamic image reproduction is carried out.

Figure 7A:
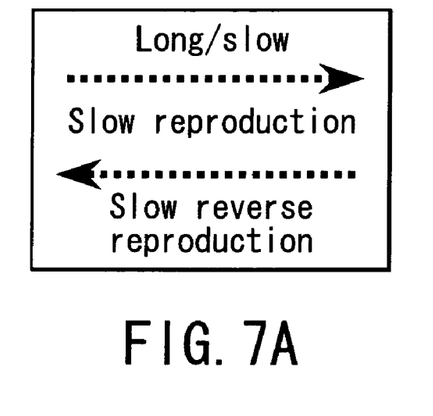
FIGS. 7A and 7B are diagrams showing the tracing operation according to the second embodiment.

FIG. 7 shows the tracing operation showing the slow reproduction and slow reverse reproduction. When the touch panel is long and slowly traced to the right from the left or to the left from the right (horizontally) by the finger or operation apparatus (tracing pen) as shown in FIG. 7A, the slow reproduction/slow reverse reproduction of the dynamic image is executed. This slow reproduction/slow reverse reproduction is canceled by the above-described tap operation, and the standard dynamic image reproduction is carried out.

Figure 7B:
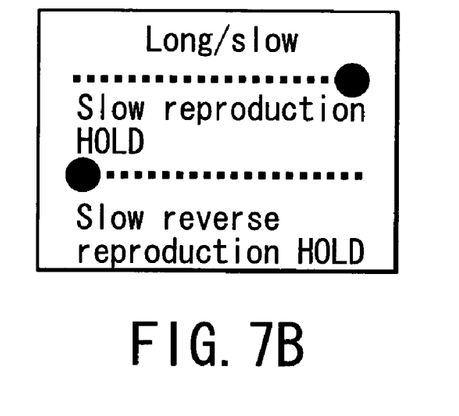

Moreover, the touch panel 110 is long and slowly traced to the right from the left or to the left from the right by the finger or operation apparatus (tracing pen) as shown in FIG. 7B. Thereafter, without detaching the fingers from the touch panel, the pressed state is maintained. Accordingly, the slow reproduction/slow reverse reproduction of the dynamic image is maintained. When the fingers are detached, the operation is canceled, and the standard dynamic image reproduction is carried out.

Figure 8A:
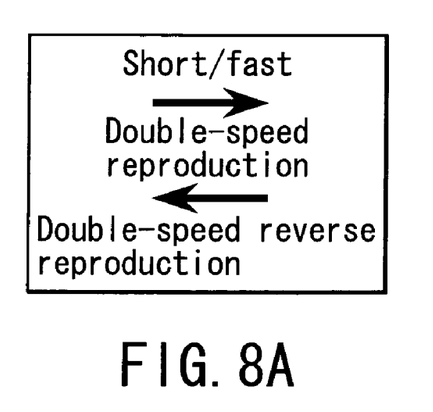
FIGS. 8A and 8B are diagrams showing the tracing operation according to the second embodiment.

FIG. 8 shows the tracing operation indicating double-speed reproduction and double-speed reverse reproduction. As shown in FIG. 8A, when the touch panel is short and fast traced to the right from the left or to the left from the right (horizontally) by the finger or operation apparatus (tracing pen), the double-speed reproduction/double-speed reverse reproduction of the dynamic image is executed. Here, "short tracing" indicates that, for example, a distance shorter than ½ of the total width of the LCD 108 is traced. This double-speed reproduction/double-speed reverse reproduction is canceled by the above-described tap operation, and the standard dynamic image reproduction is carried out.

Figure 8B:
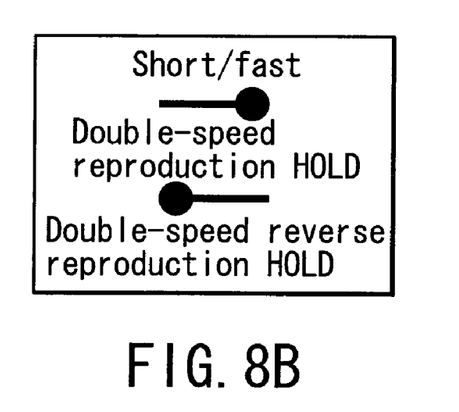

Moreover, the touch panel 110 is short and fast traced to the right from the left or to the left from the right by the finger or operation apparatus (tracing pen) as shown in FIG. 8B. Thereafter, without detaching the fingers from the touch panel, the pressed state is maintained. Accordingly, the double-speed reproduction/double-speed reverse reproduction of the dynamic image is maintained. When the fingers are detached, the operation is canceled, and the standard dynamic image reproduction is carried out.

Figure 9A:
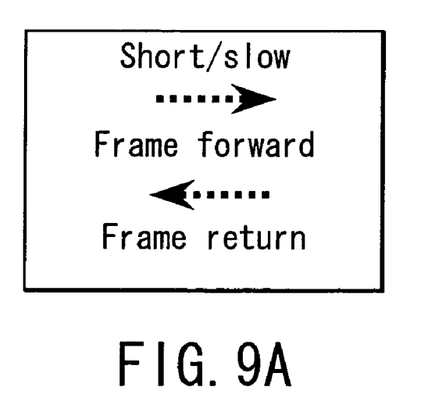
FIGS. 9A and 9B are diagrams showing the tracing operation according to the second embodiment.

FIG. 9 shows the tracing operation indicating frame feed and frame return. As shown in FIG. 9A, when the touch panel is short and slowly traced to the right from the left or to the left from the right by the finger or operation apparatus (tracing pen), the frame feed/frame return of the dynamic image is executed. This frame feed/frame return is canceled by the above-described tap operation, and the standard dynamic image reproduction is carried out.

Figure 9B:
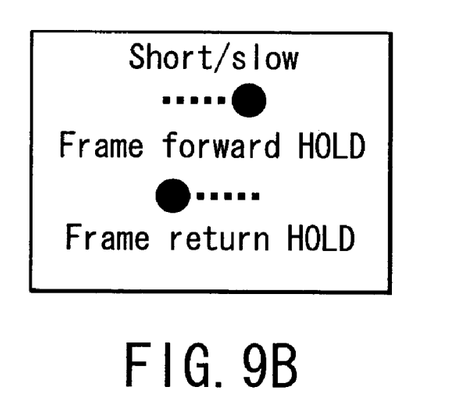

Moreover, the touch panel 110 is short and slowly traced to the right from the left or to the left from the right by the finger or operation apparatus (tracing pen) as shown in FIG. 9B. Thereafter, without detaching the fingers from the touch panel, the pressed state is maintained. Accordingly, the frame feed/frame return of the dynamic image is maintained. When the fingers are detached, the operation is canceled, and the standard dynamic image reproduction is carried out.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A digital still camera comprising:
   a photographing section which converts an optical image into an electric signal;
   a recording section which records a dynamic image obtained by the photographing section as a dynamic image file in a storage medium;
   a reproduction section which reproduces the dynamic image recorded by the recording section;
   a display section which displays the dynamic image reproduced by the reproduction section;
   a touch panel which is disposed to cover a display surface of the display section and by which a user's instruction is inputted;
   a detection section which detects a tracing operation by a user on the touch panel; and
   a control section which judges a direction and speed of the tracing operation detected by the detection section and which determines a process in accordance with the direction and speed to control dynamic image reproduction by the reproduction section,
   wherein when a touch operation in which the position does not change is detected following the tracing operation detected by the detection section, the control section continues to execute the process in accordance with the direction and speed while detecting the touch operation, and when the touch operation is not detected, the control section cancels the process in accordance with the direction and speed.

2. The digital still camera according to claim 1, wherein the control section executes one of fast forward and rewind reproduction of the dynamic image in response to a long and fast tracing operation in a horizontal direction on the touch panel.

3. The digital still camera according to claim 1, wherein the control section executes one of slow reproduction and slow reverse reproduction of the dynamic image in response to a long and slow tracing operation in a horizontal direction on the touch panel.

4. The digital still camera according to claim 1, wherein the control section executes one of double-speed reproduction and double-speed reverse reproduction of the dynamic image in response to a short and fast tracing operation in a horizontal direction on the touch panel.

5. The digital still camera according to claim 1, wherein the control section executes one of frame feed reproduction and reverse frame feed reproduction of the dynamic image in response to a short and slow tracing operation in a horizontal direction on the touch panel.

6. The digital still camera according to claim 1, wherein the control section cancels the process being executed in accordance with the direction and speed to execute standard dynamic image reproduction in response to touch input in one arbitrary point on the touch panel for a short time.

7. The digital still camera according to claim 1, wherein the control section controls the reproduction section so as to continuously execute the process in accordance with the direction and speed, after the process in accordance with the direction and speed is started by the reproduction section and while the touch operation in the arbitrary position on the touch panel is detected by the detection section.

8. The digital still camera according to claim 1, wherein at the time of standard dynamic image reproduction, the control section temporarily stops the standard dynamic image reproduction being executed in response to touch input in one arbitrary point on the touch panel for a short time, and reproduces a still image corresponding to a temporary stop position on the dynamic image file.

9. A user instruction input method of inputting a user's instruction in a digital still camera including:
   a photographing section which converts an optical image into an electric signal; a recording section which records a dynamic image obtained by the photographing section as a dynamic image file in a storage medium;
   a reproduction section which reproduces the dynamic image recorded by the recording section;
   a display section which displays the dynamic image reproduced by the reproduction section; and a touch panel which is disposed to cover a display surface of the display section and by which the user's instruction is inputted, the reproduction section including at least one reproduction function of fast forward/rewind reproduction, slow reproduction/slow reverse reproduction, double-speed reproduction/double-speed reverse reproduction, and frame feed reproduction/reverse frame feed reproduction of the dynamic image, the method comprising:
   detecting a tracing operation by a user on the touch panel; and
   judging a direction and speed of the detected tracing operation and determining the reproduction function in accordance with the direction and speed to control the dynamic image reproduction by the reproduction section, wherein the controlling of the dynamic reproduction includes: when a touch operation in which the position does not change is detected following the detected tracing operation, continuing to execute a process in accordance with the direction and speed while detecting the touch operation; and when the touch operation is not detected, canceling the reproduction process in accordance with the direction and speed.

* * * * *